(12) United States Patent
Kolacz et al.

(10) Patent No.: US 8,733,387 B2
(45) Date of Patent: May 27, 2014

(54) PORTABLE REMOTE CONTROLLED VALVE

(75) Inventors: David J. Kolacz, Plymouth, IN (US);
Stewart G. McMillan, Valparaiso, IN (US); Scott W. Akins, Valparaiso, IN (US); Timothy S. Miller, Kouts, IN (US)

(73) Assignee: Task Force Tips inc., Valparaiso, IN (US)

( * ) Notice: Subject to any disclaimer, the term of this patent is extended or adjusted under 35 U.S.C. 154(b) by 637 days.

(21) Appl. No.: 12/950,475

(22) Filed: Nov. 19, 2010

(65) Prior Publication Data

US 2012/0126155 A1 May 24, 2012

(51) Int. Cl.
*F16K 1/12* (2006.01)

(52) U.S. Cl.
USPC ............................................. 137/221; 251/25

(58) Field of Classification Search
USPC ...................... 137/219, 212, 222, 221; 251/25
See application file for complete search history.

(56) References Cited

U.S. PATENT DOCUMENTS

| | | | | |
|---|---|---|---|---|
| 845,063 | A | * | 2/1907 | Desper .......................... 137/219 |
| 1,723,359 | A | * | 8/1929 | Larner ........................... 137/222 |
| 2,052,572 | A | * | 9/1936 | Kerr ............................... 137/222 |
| 2,725,891 | A | * | 12/1955 | De Bourguignon et al. .. 137/219 |
| 2,910,266 | A | * | 10/1959 | Condello ........................ 251/25 |
| 3,515,165 | A | * | 6/1970 | Zadoo ............................ 137/220 |
| 3,825,026 | A | * | 7/1974 | Salerno et al. ................. 137/219 |
| 3,945,393 | A | * | 3/1976 | Teatini ........................... 137/220 |
| 3,981,618 | A | | 9/1976 | Nelson, Jr. |
| 4,008,733 | A | * | 2/1977 | Courant et al. ................ 137/220 |
| 4,026,327 | A | * | 5/1977 | Deinlein-Kalb .............. 137/630 |
| 4,114,653 | A | | 9/1978 | Carlin |
| 4,189,005 | A | | 2/1980 | McLoughlin |
| 4,268,004 | A | | 5/1981 | Gatin |
| 4,323,219 | A | | 4/1982 | Carlin |

(Continued)

OTHER PUBLICATIONS

Automatic Fire Protection Control Valves product sheet, OCV Control Valves, Tulsa, Oklahoma (circa Aug. 2010; 2 pp.).

(Continued)

*Primary Examiner* — John Rivell
*Assistant Examiner* — Matthew W Jellett
(74) *Attorney, Agent, or Firm* — Marshall, Gerstein & Borun LLP

(57) ABSTRACT

A portable remote controlled fire-fighting valve has a central chamber in a main valve body, an inlet that connects to a hydrant, an outlet that connects to a fire hose, a valve mechanism that has a seating surface that seats against part of the device to open and close a flow channel through the central chamber, and a remote controller that enables an operator to selectively open and close the flow channel. The valve mechanism uses a piston that is mounted for axial movement within the central chamber. The piston has an annular wall that slides against an outer edge of a lateral chamber surface that is fixed in position within the main valve body. A spring biases the piston to the closed position. In the open position, water from the inlet flows around the piston, over its peripheral surface, to the outlet. A pressure chamber is formed between a lateral surface that is fixed in position within the valve body and a movable interior surface on the piston. A pilot channel extends from an upstream side of the flow channel to the pressure chamber. The remote controller selectively controls a pilot valve on the pilot channel, allowing liquid in the upstream side of the flow channel to flow to the pressure chamber and force the piston open.

20 Claims, 14 Drawing Sheets

(56) References Cited

U.S. PATENT DOCUMENTS

| | | |
|---|---|---|
| 4,561,459 A | 12/1985 | Jackman |
| 4,580,596 A | 4/1986 | Stehling |
| 4,651,772 A | 3/1987 | Carlin |
| 5,178,185 A | 1/1993 | Stehling et al. |
| 6,279,594 B1 * | 8/2001 | Beitzel et al. .................... 137/1 |
| 7,040,339 B2 | 5/2006 | Istre, Jr. |
| 7,055,542 B2 * | 6/2006 | Delobel et al. ................ 137/219 |

OTHER PUBLICATIONS

Bermad Fire Protection 400E Deluge Valve product sheet, Bermad Water Control Solutions (circa Jul. 2011).

Cla-Val valve product sheet, Cla-Val, Newport Beach, California (circa Aug. 2010; 2 pp.).

Hydrant Helper brochure, Wellspring, Spokane, Washington (circa Aug. 2010; 2 pp.).

* cited by examiner

PORTABLE REMOTE CONTROLLED VALVE

CROSS-REFERENCE TO RELATED APPLICATIONS

Not applicable.

BACKGROUND OF THE INVENTION

The present invention relates generally to firefighting equipment and more particularly to a portable valve that can be attached to fire hydrants and operated remotely.

In firefighting, fire hoses are usually connected to those fire hydrants nearest the fire, which are oftentimes hundreds of feet from the fire. A fireman removes a hose and hardware from the fire truck and places it at the hydrant. The firefighter then flushes the hydrant and attaches a valve and hose. When the hose is attached, the hydrant is opened; but it is not always known whether the valve itself will need to be opened. Opening the valve fills the hose with water, and commits the firefighters to a time-consuming and physically demanding process of draining the hose before it can be rolled and stored. This time commitment can be dangerous because the firefighters can be called to another site at any time, and added firefighter stress can cause a variety of problems.

To avoid the commitment that results from opening a valve, firefighters can be reluctant to open a valve until it is clear that doing so is needed or justified. When the hydrant is located far from the fire location, a firefighting team could send a firefighter back to the hydrant to open the valve only after confirming that the valve should be opened. However, sending a firefighter back to a remote hydrant requires time when time may be at a premium and occupies a firefighter who might be better employed at the fire scene. Firefighting teams sometimes leave one firefighter stationed at the hydrant, but this is still inefficient, particularly when the team has few members.

U.S. Pat. Nos. 4,580,596; 5,178,185; 7,040,339; and 3,981,618 all disclose valves that can be used in firefighting, but none of those valves offer a good solution to this long-felt problem.

Instead, hose clamps such as those seen in U.S. Pat. No. 4,268,004 have been developed. Those clamps enable a firefighter to open a hydrant without committing to completely filling the hose. However, some water must flow through the hose even to keep the valve closed. Furthermore, the hose clamp cannot be commanded from a remote distance to quickly shut off the flow of water as might be needed in the case of a burst hose.

Alternatively, special time-delay valves such as those described in U.S. Pat. Nos. 4,022,421; 4,114,653; and 4,651,772 can be attached to a hydrant. Those valves delay the flow of water into the hose for a period of time after the hydrant is opened. This approach gives firefighters time to assess the situation and close the hydrant before water flows into the hose, but is also dangerous. First, the device can lead to a dangerous situation if the firefighters forget that the hydrant has been opened. Second, the device delays the flow from the hydrant even when firefighters find that they need water from the hydrant immediately.

Other devices that attempt to solve the problem, such as the device covered by U.S. Pat. No. 4,561,459, use battery power to mechanically open the hydrant on radio commands. Another device used a battery-powered gate valve that was attached between the hydrant and the hose and could be opened and closed on radio commands. These devices are (or were) bulky, heavy, and expensive, and require significant battery power to provide the motive force needed to act against the water pressure. Because battery life is a significant concern, some firefighters viewed these remote control devices with skepticism.

No known prior device found universal market acceptance.

BRIEF SUMMARY

The applicants have developed a portable remote controlled valve that offers a better solution. Like the prior remote controlled gate valve, the new valve has a central chamber in a main valve body, an inlet to that central chamber that connects to a hydrant, an outlet from the central chamber that connects to a fire hose, a valve mechanism that has a seating surface that seats against part of the device to open and close a flow channel through the central chamber, and a remote controller that enables an operator to selectively open and close the flow channel. However, the new valve requires significantly less battery power than comparable prior devices, and is thus can be made less bulky, less expensive, and more reliable.

To achieve these benefits, the valve mechanism in the new device uses a piston that is mounted for axial movement within the central chamber. The piston has an annular wall that slides against an outer edge of a lateral chamber surface that is fixed in position within the main valve body. A spring biases the piston to the closed position. In the open position, water from the inlet flows around the piston, over its peripheral surface, to the outlet.

Unlike the prior products that are described above, the new valve uses a pressure chamber that is formed between a lateral surface that is fixed in position within the valve body and a movable interior surface on the piston. A pilot channel extends from an upstream side of the flow channel to the pressure chamber. Instead of controlling the valve directly, the remote controller is used to selectively control a pilot valve on the pilot channel, allowing liquid in the upstream side of the flow channel to flow to the pressure chamber and force the piston open. Other details of the new valve can provide other advantages. Specifically, advantages can sometimes be derived from positioning parts of the pilot channel in a valve shaft that is fixed within the main valve body, and providing the lateral chamber surface on a downstream shaft end that extends radially outwardly from the valve shaft. Similarly, there may be advantages in providing the piston with a second end that slides over a surface on a sleeve around the valve shaft. Advantages might also be derived from providing a spring chamber between a second wall on the piston and the sleeve, where it is isolated from the flow channel. The spring can be mounted in that chamber, around the valve shaft.

The pilot valve may be connected to a control shaft that is rotated by a servo motor. Such a shaft can be provided with a handgrip that can be manually controlled, providing a simple manual override. The pilot valve can also be arranged to vent the pressure chamber to the atmosphere when the pilot valve is in the closed position.

To meet the particular needs of firefighters, the new arrangement enables valve components to be sized and selected so that when the pilot valve is open, liquid pressure of 50 to 180 psi in the upstream side of the flow channel fully opens the valve in 10-20 seconds, and the valve weighs less than 50 pounds and measures less than 30" in height, in width, and in depth.

BRIEF DESCRIPTION OF THE DRAWINGS

The invention may be better understood by referring to the accompanying drawings, in which.

DETAILED DESCRIPTION

Figure 1:
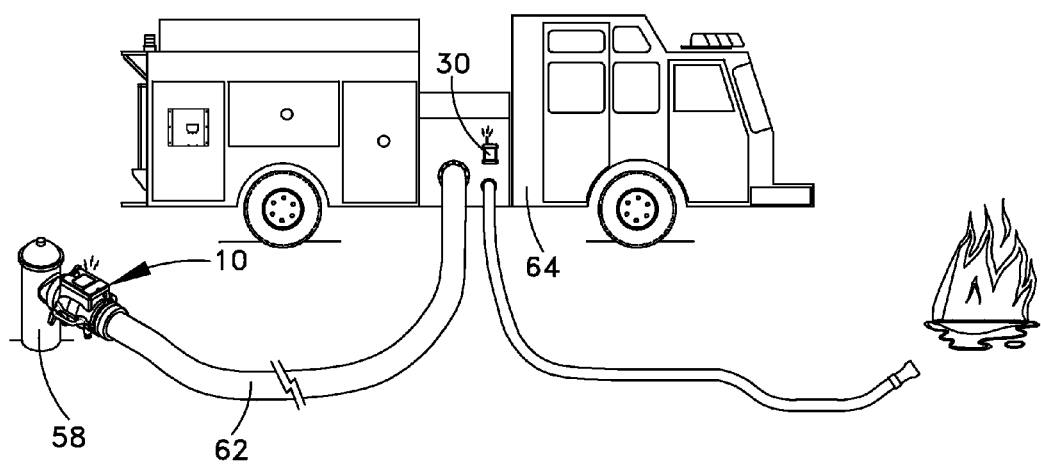
FIG. 1 is a schematic view of a fire scene.
Figure 17:
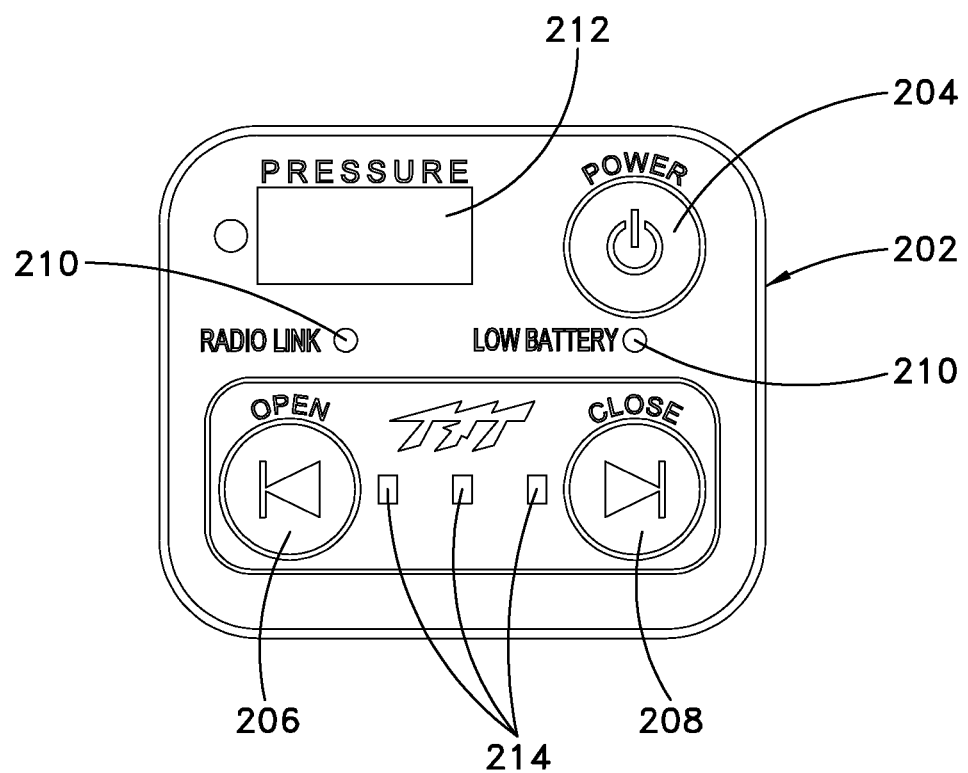
FIG. 17 is a front elevation view of a control panel for the valve.
Figure 18:
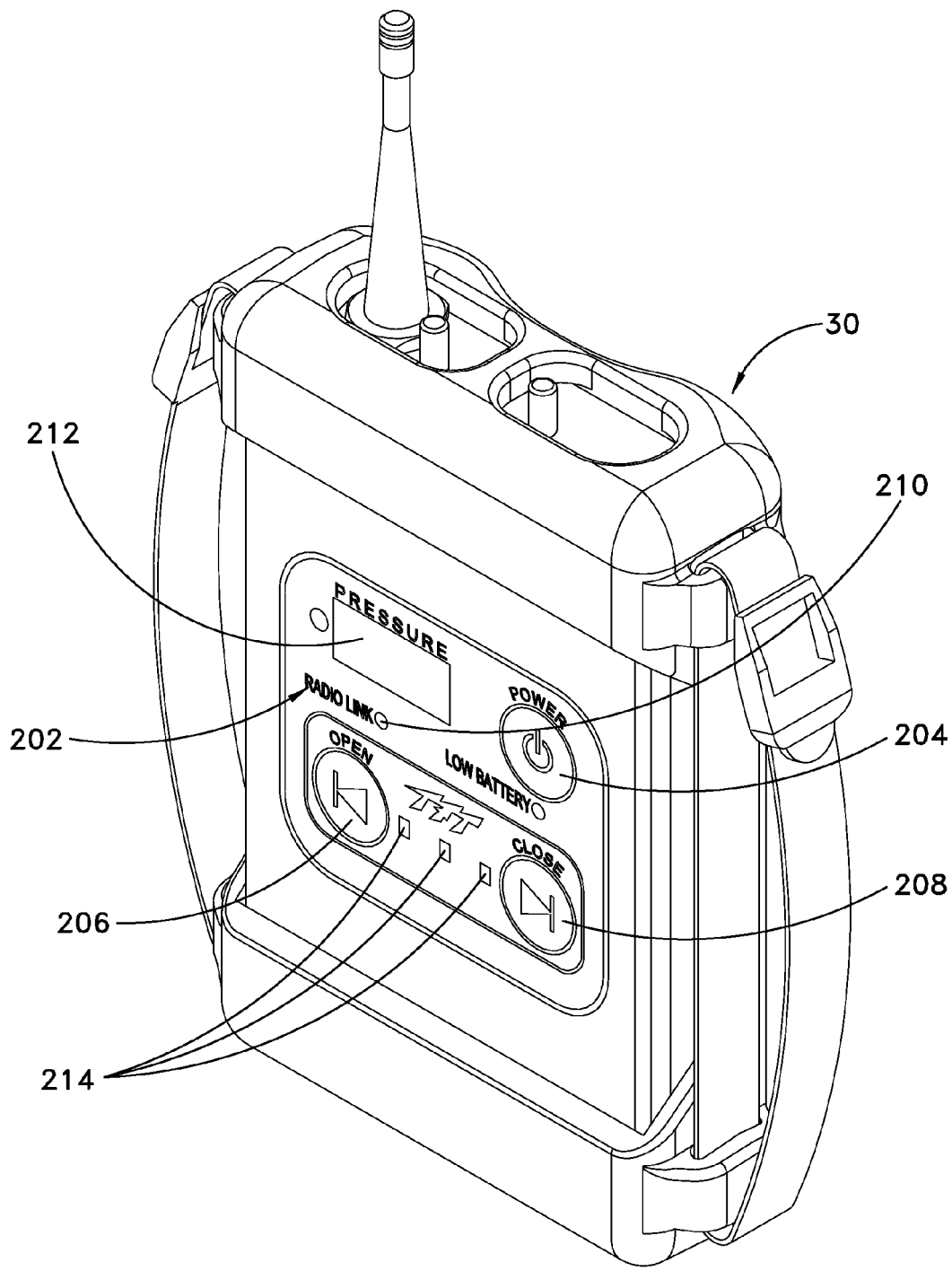
FIG. 18 is an isometric view of a remote controller for the valve.

One possible example of a portable valve 10 that embodies the new invention can be seen in FIG. 1. As better seen in FIGS. 3B and 9-16, the valve has a main valve body 12, a valve shaft 14, a piston 16, and a spring 18. Each of these elements will be discussed in separate sections below. A pressure chamber 20 (best seen in FIGS. 3B, 12, 12A, and 14-16) is formed between the valve shaft and the piston, and is described in a separate section. A pilot channel 22, a pilot opening 24, and a pilot valve 26 (best seen in FIGS. 3B and 12A) are incorporated into the components, and will also be discussed in a separate section. The pilot valve is controlled by a pilot shaft 180 and electronics within an R/C housing 28, which will also be discussed. A remote controller 30 (seen in FIGS. 1, 17 and 18) will be discussed in a final section.

The Valve Body

The main valve body 12 has a central chamber 36, an inlet 38 to the central chamber, and an outlet 40 from the central chamber. These components of the illustrated portable valve 10 can be best seen in FIGS. 10-12. The valve body that is illustrated in these figures is made of ¼" to 1¼" thick cast aluminum in a generally tubular shape that is 8"-16" long from the inlet to the outlet, and 5-12" in diameter (the illustrated valve body is 11¾" long and 7½" in diameter). In the illustrated example, the central chamber is widest in a relatively cylindrical section 42 between the inlet and the outlet, and the ends of the central chamber turn radially inwardly toward the inlet and the outlet.

Both the illustrated inlet 38 and the illustrated outlet 40 are circular openings, between 3" and 10" in diameter. The illustrated inlet and outlet have a 4½" diameter waterway. Other materials and sizes can also be used. For example, the outlet 40 seen in FIG. 3A accommodates a positionable elbow joint 44, such as the one described in U.S. Pat. No. 6,820,630. A ball race swiveling outlet 46, such as the one seen in FIG. 3B, can also be used.

Figure 5:
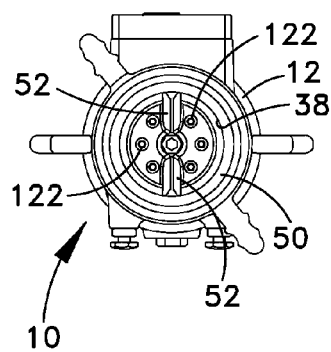
FIG. 5 is a rear elevation of the valve seen in FIG. 4.
Figure 6:
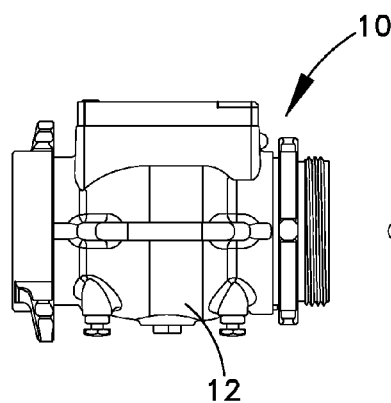
FIG. 6 is a side elevation of the valve seen in FIG. 4.
Figure 7:
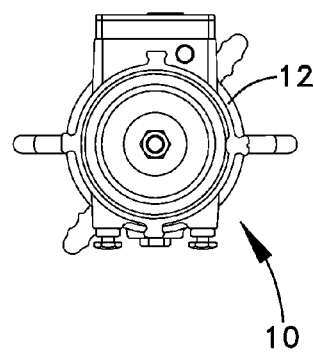
FIG. 7 is a front elevation of the valve seen in FIG. 4.
Figure 8:
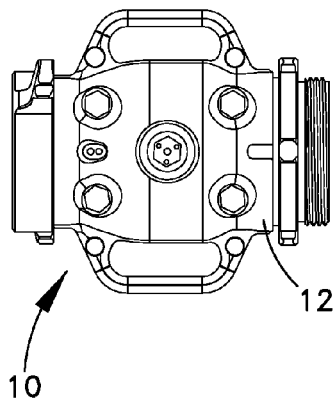
FIG. 8 is a bottom plan view of the valve seen in FIG. 4.

The illustrated valve body 12 has an integrally cast front face 50 that has the form of ½" to 2" wide spokes 52 (FIGS. 5 and 10) that extend across the diameter of the valve body near the inlet 38. The illustrated front face measures between ½" and 4" from front to back. Openings in the face (between the spokes) enable water to flow past the front face into the central chamber 36.

An optional automatic drain is shown on the valve body 12 that is illustrated here. This automatic drain 54 (FIG. 3B) seals closed when water in the central chamber 36 is under pressure, but opens and enables water to drain from the valve 10 when the pressure in the central chamber is released below a predetermined threshold such as 10 psi. This action helps to ensure that water is not trapped in the valve body between uses, where the water could freeze and damage the valve or interfere with its proper functioning.

Figure 2:
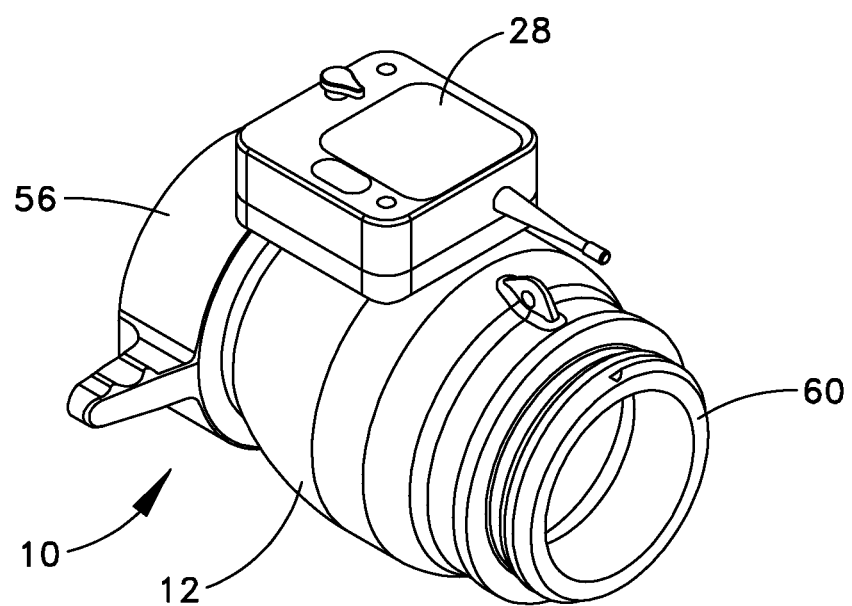
FIG. 2 is an isometric view of one embodiment of a valve that uses the new invention.

A coupling on the inlet 38 is conventionally configured to connect to fire hydrants, such as the hydrant 58 seen in FIG. 1. The coupling 56 illustrated in FIG. 2 is a standard 4½" National Hose (NH) female threaded coupling. Similarly, the outlet 40 is provided with an outlet coupling 60 to be attached to fire hoses, such as the hose 62 see in FIG. 1, which runs from the valve to the fire truck 64. Here, standard 4½" NH male threads are provided on the outlet. On both the inlet and the outlet, standard Storz quick connect couplings 56', 60' (such as those seen in FIG. 3) or other forms of couplings may also be used.

A replaceable valve seat 66 (best seen in FIGS. 3B, 9, 11, and 12) is mounted between the valve body 12 and the outlet coupling 60. In comparison to the valve body 12, the valve seat is preferably made of a relatively resilient, replaceable material such as ultra-high molecular weight polyethylene.

Heat-treated aluminum alloy is the preferred material for the main valve body 12, the couplings 56, 60, and all the other structural components because portable valves need to be strong yet lightweight, and aluminum is far less costly than titanium. Wetted aluminum components can be protected against corrosion by one or more protective layers such as hard anodizing, powder coating, paint, or E-coating.

Figure 3:
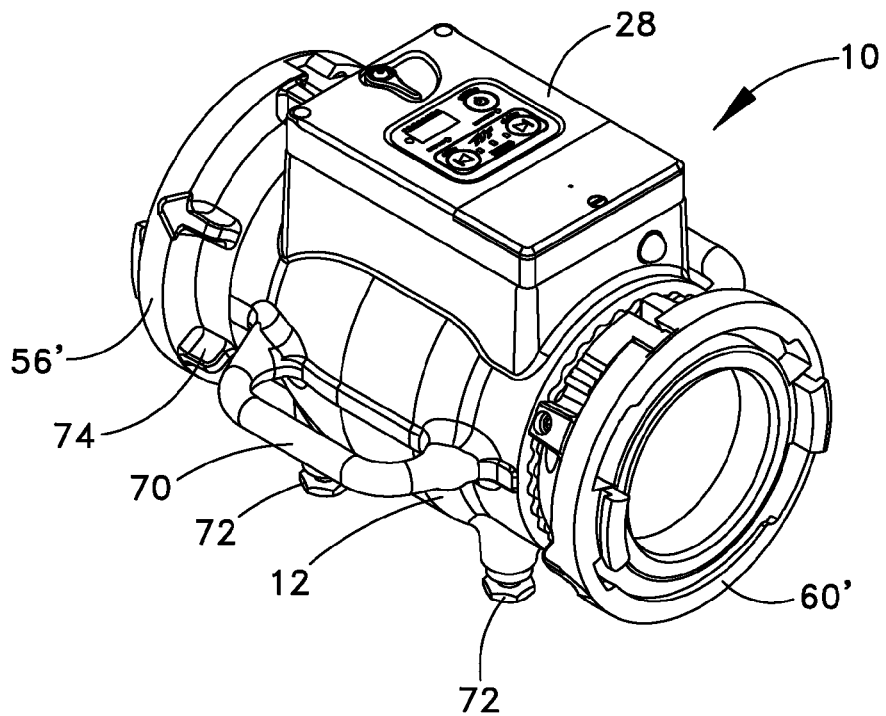
FIG. 3 is an isometric view of a second embodiment of a valve that uses the new invention.
Figure 3A:
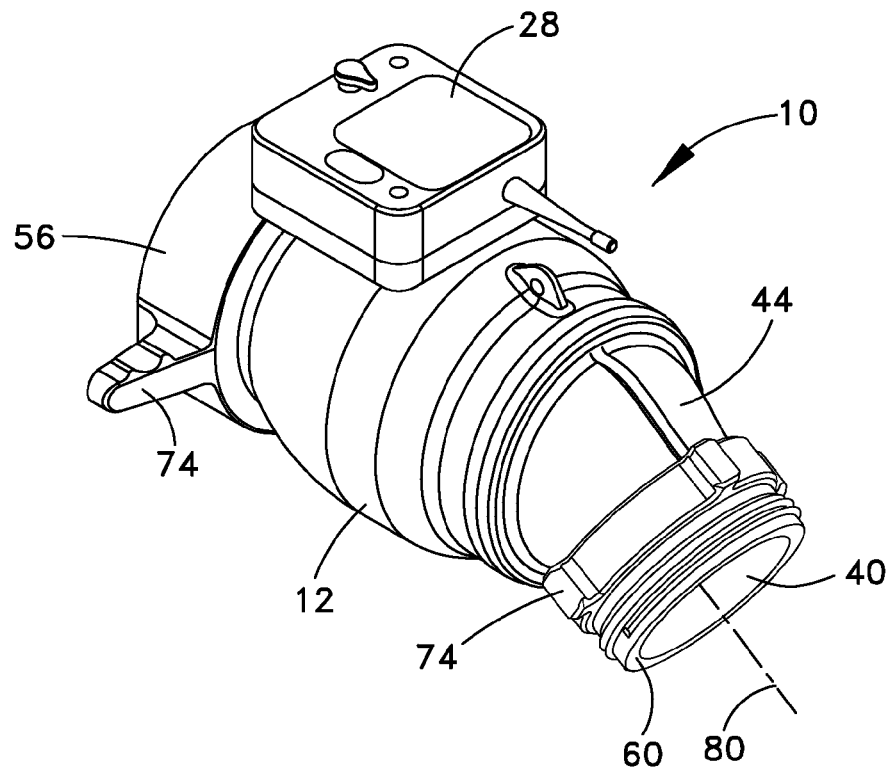
FIG. 3A is an isometric view of a third embodiment of a valve that uses the new invention.

The alternative main valve body 12 seen in FIGS. 2 and 3A does not have the optional pair of carrying handles 70 and the optional four foot pads 72 seen in the embodiment of FIG. 3. The foot pads can be secured into a valve mounting bracket that is bolted to a fire engine. Wrenching lugs 74 can also be provided on the couplings to assist in the connecting process.

The Valve Shaft

The valve shaft 14 provides a base for the piston 16. The valve shaft is fixed within the valve body 12 and, in the illustrated example (best seen in FIGS. 10-12), extends along an axis 80 from the inlet 38 toward the outlet 40. The illustrated valve shaft sits in a shaft locator 82 in the front face 50 on the valve body. Where it is joined to the front face of the valve body, the illustrated valve shaft is between ¾" and 4" in diameter. The valve shaft and the front face can be secured in any convenient way, including, for example, a threaded connection or a nut.

Figure 12:
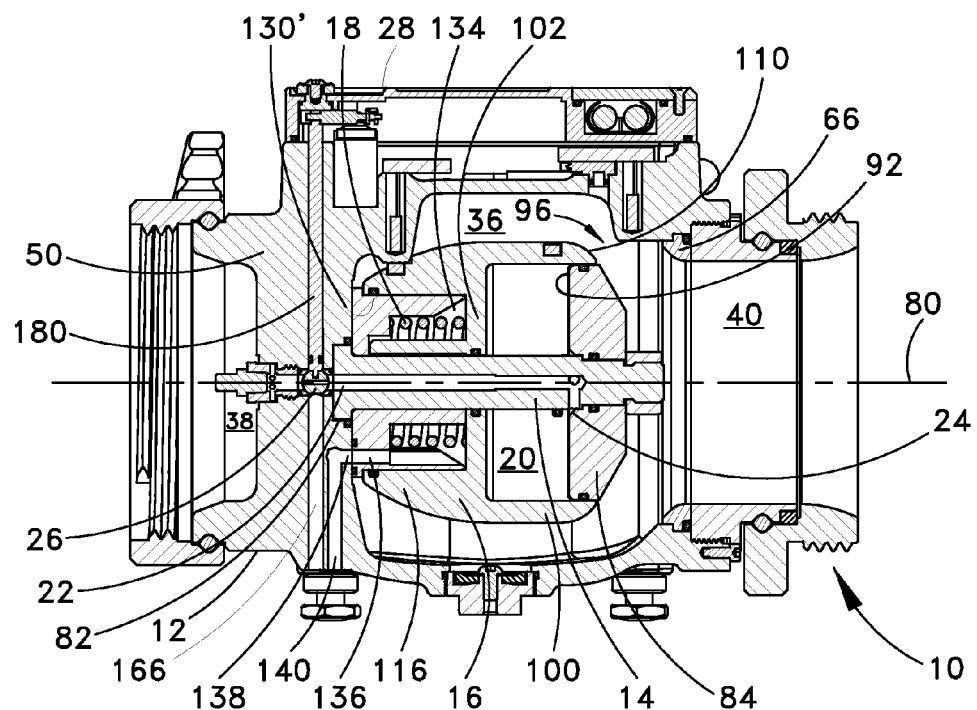
FIG. 12 is a cross-sectional view of the valve body seen in FIG. 4, with the valve in an open position.
Figure 12A:
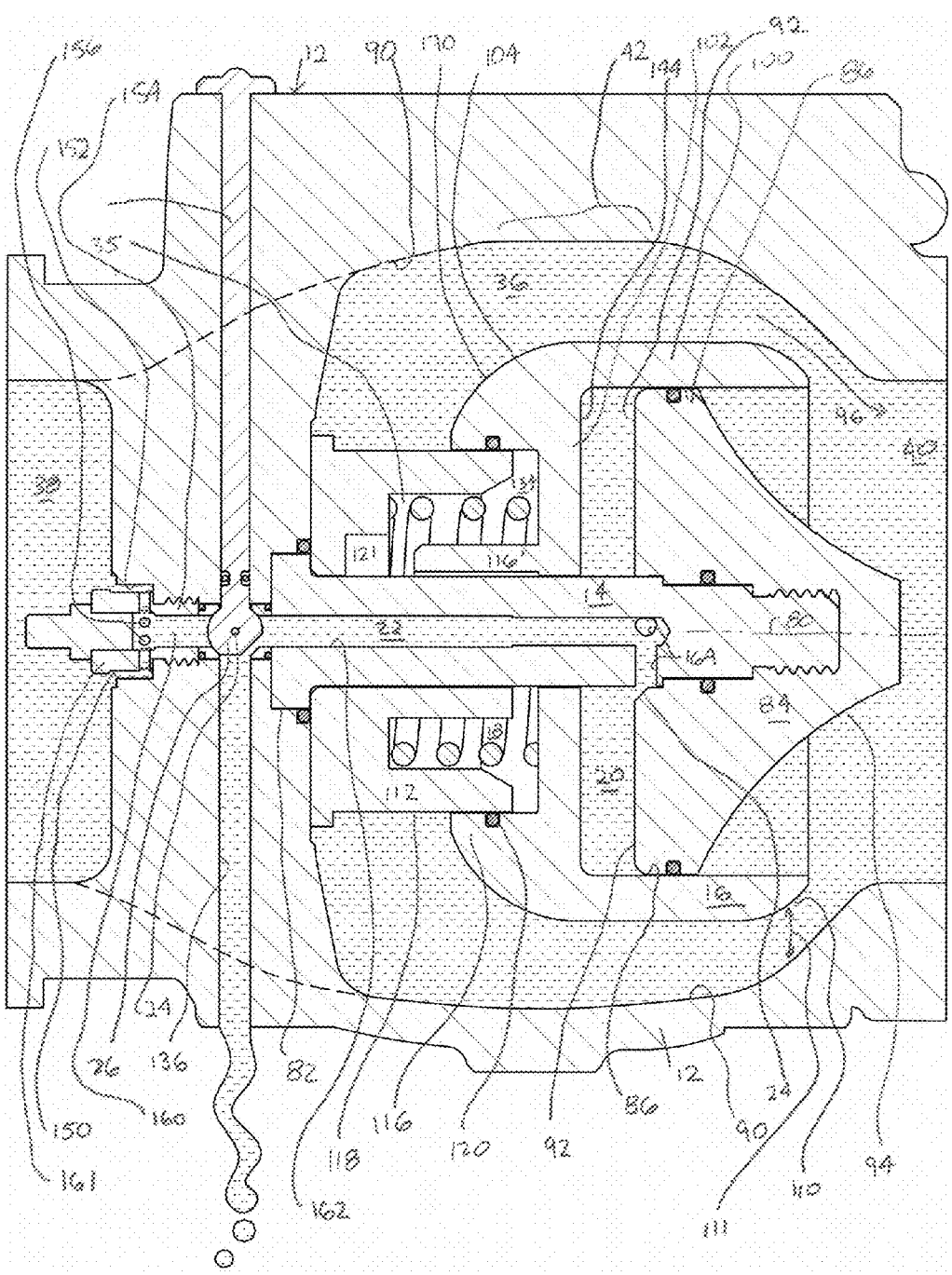
FIG. 12A is an enlarged view of the valve body seen in FIG. 4, with the pilot valve in a different position.

In the illustrated valve 10, the downstream end of the valve shaft 14 has a cone-shaped shaft end 84. This shaft end is fixed to the valve shaft, and thus is also fixed in position within the main valve body 12. The illustrated shaft end is between 3" and 7" in diameter and, as seen in FIG. 12A, leaves a space of between ¾" and 2½" between an outer edge 86 of the shaft end and the inside surface 90 of the main valve body. In this example, the outer diameter of the shaft end is approximately 4½" and the radial spacing between the outer edge of the shaft end and the inside surface of the main valve body is approximately 1½".

The illustrated shaft end 84 tapers in axial length from between 1" and 3" in length at the axis 80 to between ⅜" and 1½" in length at its outer edge 86. In the example seen in FIG. 12A, an upstream lateral chamber surface 92 on the shaft end is planar and perpendicular to the axis 80 of the valve shaft 14, and the opposite, downstream face 94 of the shaft end is shaped as a concave curve. Other arrangements, including a conical downstream face that is angled between 15° and 45° from the perpendicular to the axis (as seen in FIGS. 9-12) might also be used.

The Piston

Figure 11:
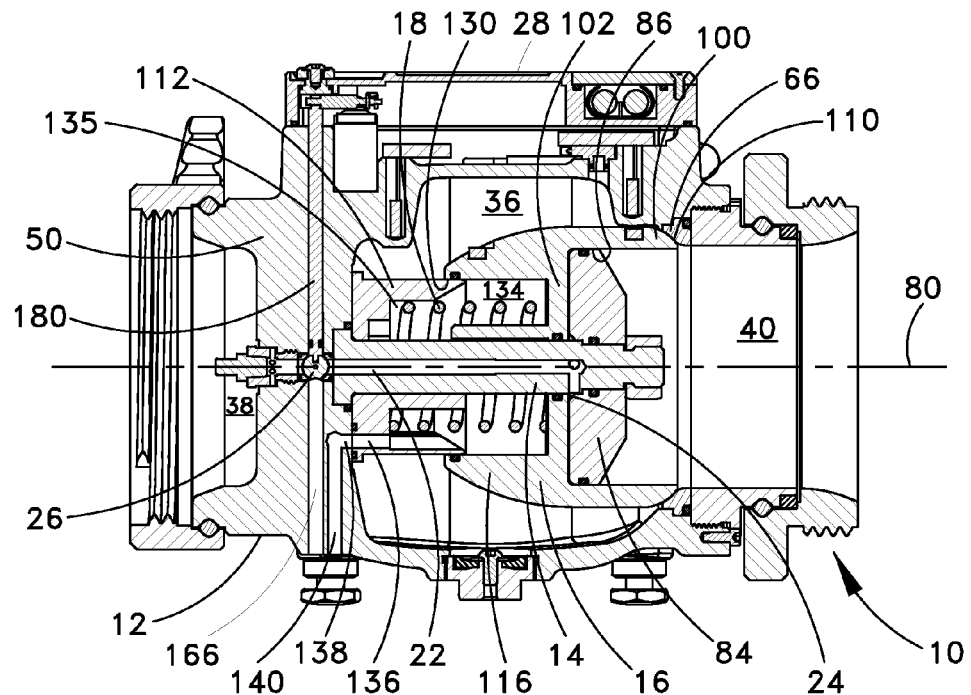
FIG. 11 is a cross-sectional view of the valve body seen in FIG. 4, with the valve in a closed position.
Figure 13:
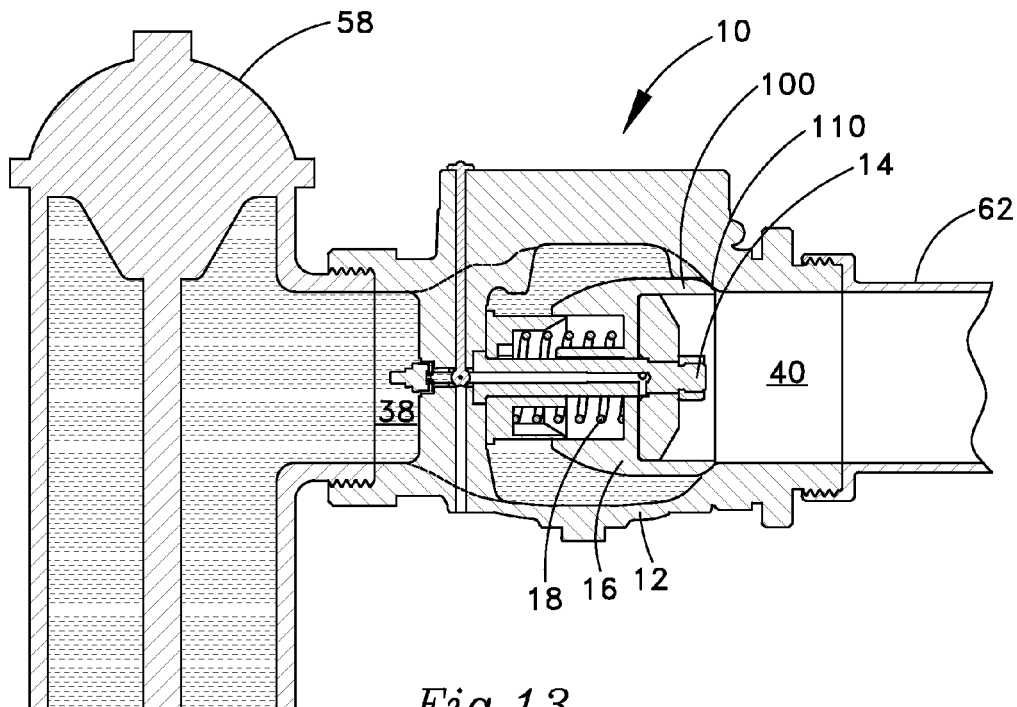
FIG. 13 is a cross-sectional schematic view of the valve on a hydrant, in the closed position.

The piston 16 is mounted within central chamber 36 of the valve body 12 and moves axially between an open position (seen in FIGS. 12 and 15) and a closed position (seen in FIGS. 11 and 13). This movement selectively opens and closes a flow channel 96 though the valve body 12. As best seen in FIG. 12A, the illustrated piston has a first annular wall 100 that extends axially from a lateral piston wall 102 and slides over the outer edge 86 of the shaft end 84, providing axial movement within the central chamber. In this illustrated valve, the entire outer peripheral surface 104 on the piston forms an inside radial boundary of the flow channel while the inside surface 90 of the central chamber forms an outer radial boundary of the flow channel.

The illustrated piston 16 has an outer diameter of approximately 5". The first annular wall 100 is approximately ½" thick and about 2" in axial length. Other arrangements are possible, including arrangements where the outlet 40 may be angled to improve flow. Preferably, the angle between the axis 80 of the valve shaft 14 and the axis 80' of the outlet 40 (FIG. 3A) is less than 45°.

In the closed position (FIGS. 11 and 13), a seating surface 110 on a forward edge of the piston 16 seats against part of the valve 10 (here, valve seat 66), preventing water from flowing past the piston to the outlet 40 and thus closing the flow channel 96 through the valve body 12. In this example, the seating surface on the piston is on a downstream end of the first annular wall 100 on the piston and is curved convexly in the axial direction.

Figure 14:
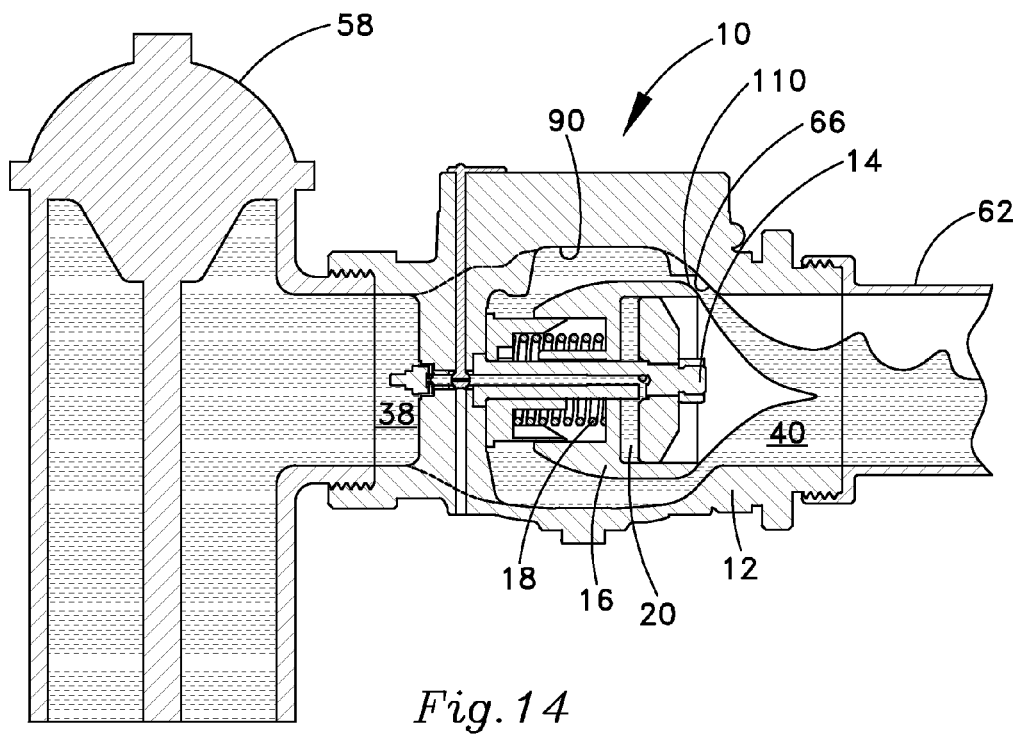
FIG. 14 is a cross-sectional schematic view of the valve on a hydrant, moving from the closed position to the open position.
Figure 15:
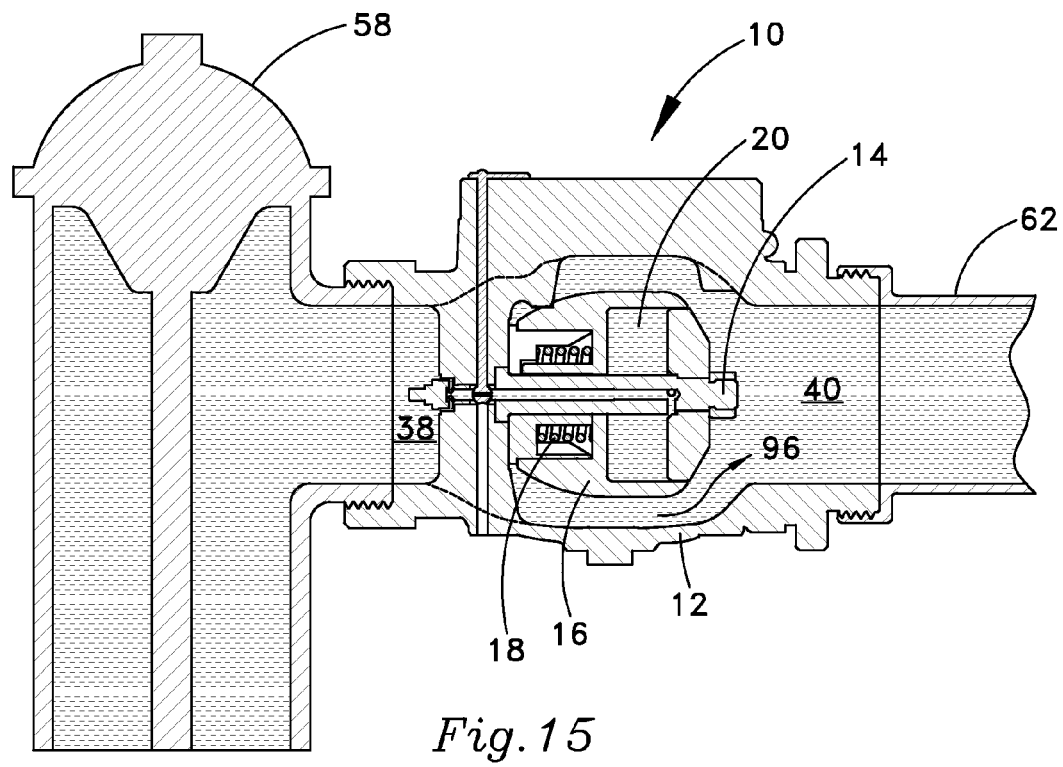
FIG. 15 is a cross-sectional schematic view of the valve on a hydrant, in the open position.

As the piston 16 moves from the closed position toward the open position (as seen in FIG. 14), the seating surface 110 retracts from the valve seat 66, opening the flow channel 96 and enabling water to flow from the inlet 38 to the outlet 40. In the illustrated valve 10, the piston travels between ¾" and 3" from the open position to the closed position. Because of the curved configuration of the inside surface 90 of the main valve body 12, this axial movement of the piston causes the radial spacing 111 (FIG. 12A) between the seating surface 110 and the inside surface of the main valve body 12 to increase and, when the piston reaches the open position (FIG. 15), ultimately provides a cross-sectional area through the flow channel that is comparable to the cross-sectional area of the inlet 38, the outlet 40, and the flow channel between them, which is formed by the peripheral surface 104 on the piston and the portions of the inside surface 90 of the central chamber 36 in the cylindrical section 42 of the central chamber. This sizing through the flow channel helps to provide good flow characteristics through the flow channel. At a flow rate of 2000 gpm, friction loss through the illustrated valve 10 is about 5 psi, which is about the same pressure loss that is experienced in about 20' of 5" diameter hose.

A sleeve 112 on the illustrated valve shaft 14 helps to guide the axial movement of the piston 16 within the central chamber 36. In the illustrated valve, the first annular wall 100 on the piston projects in a downstream direction from the lateral piston wall 102. As best seen in FIG. 12A, a second annular wall 116 on the illustrated piston projects from the lateral piston wall in an opposite, upstream direction. An o-ring 120 is used to help provide a liquid-tight seal between these elements. In the illustrated valve, this second annular wall slides over an outer surface 118 of the sleeve. In this embodiment, a third annular wall segment 116' also extends in the upstream direction, and slides over the valve shaft, seating in a pocket 121 within the sleeve. The illustrated third annular wall segment is about the same axial length as the first annular wall 100. In the arrangement seen in FIGS. 11-16, there is no third annular wall segment, and the second annular wall is about the same axial length as the first annular wall. Other arrangements are possible.

Figure 9:
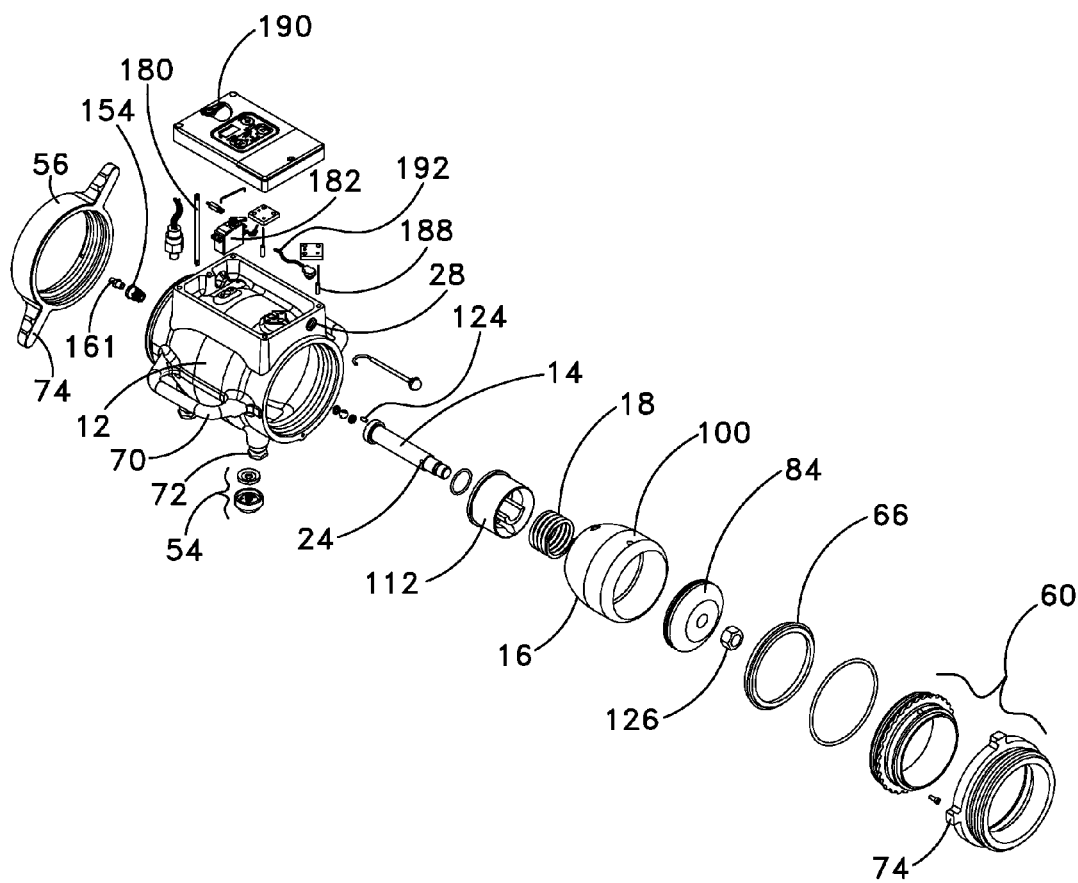
FIG. 9 is an exploded view of the valve seen in FIG. 4.
Figure 10:
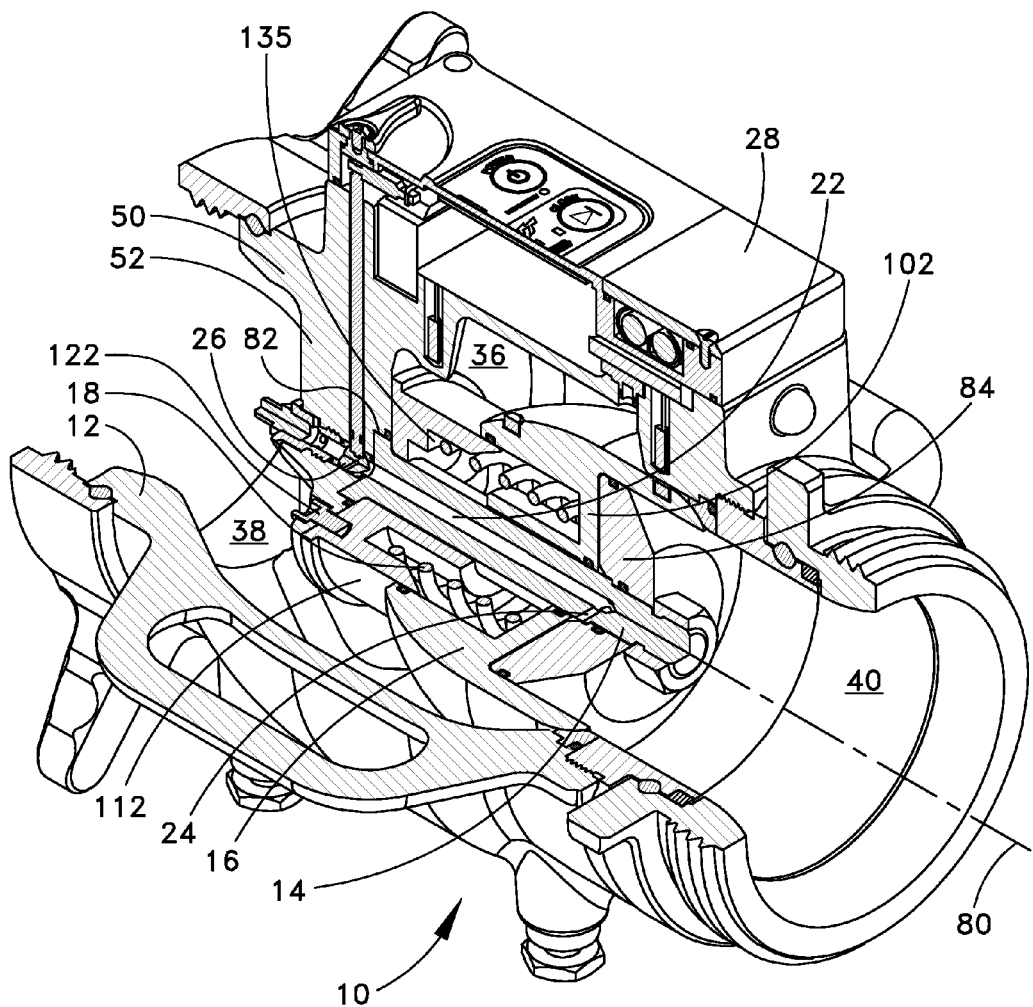
FIG. 10 is a cut-away view of the main valve body and interior components of the valve seen in FIG. 4.

As seen in FIG. 10, the sleeve 112 and the valve shaft 14 are held in position against the forces of water pressure by securing the sleeve to the front face 50 of the valve body 12 by screws 122, trapping the shaft in position. If the shaft end 84 is retained by threads or a threaded fastener 126, the valve shaft may be retained against rotation with the valve body by a dog 124 (FIG. 9).

When the piston 16 is farthest from the back (upstream side) of the sleeve 112 (as in FIG. 11), the point of contact 130 between the piston and the sleeve is no more than 1" and 5" away from the outer edge 86 of the shaft end 84 over which the first annular wall 100 of the piston slides. To help prevent wedging of the piston, the preferred minimum distance in an arrangement like this between this point of contact and the point of contact 130' when the piston is closest to the back of the sleeve (as seen in FIG. 12) is generally at least 50% of the diameter of the larger of the two annular walls 100, 116.

The Spring

The spring 18 biases the piston 16 to the closed position. In the illustrated example, the spring is a coil spring that is mounted around the valve shaft 14, as seen in FIGS. 3B and 10-12. The illustrated spring has a force that closes the piston only when the water pressure from the hydrant 58 is less than 5 psi.

In the illustrated valve 10, the spring 18 is mounted in a spring chamber 134 that is formed between the lateral piston wall 102 and a pocket 135 in the sleeve 112 around the valve shaft 14. As the piston advances, this spring chamber is isolated from the flow channel 96 by the second annular wall 116 on the piston 16. Isolating the spring chamber from the flow channel helps to keep the spring dry, which in turn can help to extend the life of the valve.

When an isolated spring chamber 134 is used, it may be desired to vent the spring chamber to allow air to escape from the chamber when the chamber contracts (as explained below) and to allow air to enter the chamber when it expands. The illustrated spring chamber is provided with a vent 136 (FIGS. 11, 12) that extends axially through the sleeve 112 and connects with an axial vent segment 138 in the front face 50 of the valve body. That axial vent segment in turn connects with a radial vent 140 that extends outwardly to the atmosphere. Other arrangements can also be used to vent the spring chamber. For example, the axial vent segment could connect to a channel used to drain the pressure chamber 20.

The Pressure Chamber

The pressure chamber 20 (best seen in FIGS. 3A, 12, and 12A) is formed between the piston 16 and the shaft end 84. In the illustrated valve, the lateral chamber surface 92 on the shaft end 84 extends radially outwardly to the outer edge 86 (FIG. 12A). The pressure chamber extends axially between that lateral chamber surface and a lateral piston surface 144 on the lateral piston wall 102. The pressure chamber is radially bounded by the inside surface of the first annular wall 100 on the upstream end of the piston and the outside diameter of the valve shaft 14, and provides a location where water pressure can act to create a valve opening force. The illustrated annular wall on the piston is a cylindrical wall that joins the lateral piston surface and radially separates the pressure chamber from the flow channel 96. Other arrangements are possible, including arrangements in which the lateral chamber surface may be neither planar nor perpendicular to the axis 80. An optional o-ring between the piston and the shaft end can help to provide a water-tight seal.

The illustrated pressure chamber 20 has a circular cross section and is approximately 4⅜" in diameter, but in some circumstances could be between 2" and 6" in diameter. When the piston 16 is in the open position, the illustrated pressure chamber is 1½" longer in axial length than it is when the piston is closed. In other settings, it could be between 1" and 6" longer in length.

The Pilot Channel, the Pilot Opening, and the Pilot Valve

It is important that the pilot channel 22 be arranged so that liquid can be made to flow into the pressure chamber 20 even when the valve 10 is in the closed position. The illustrated pilot channel 22 extends from an upstream side of the flow channel 96 to the pilot opening 24, providing a source of pressurized liquid that can be directed into the pressure chamber.

As best seen in FIG. 12A, the illustrated pilot channel 22 begins at an entrance annulus 150 that receives water from upstream side of the flow channel 96 and serves to filter out sand or debris that otherwise might accumulate within or plug up the pilot channel. The entrance annulus is formed between a bore hole 152 in the main valve body 12 and a filter 154 and may be sized with a gap of 0.020".

The filter 154 may be equipped with an air fitting 161. Such a fitting can be used to blow out standing water from inside the pilot channel 22 and the pressure chamber 20 with compressed air when the valve 10 is not in use. Removing such water helps to prevent freezing in these areas on subsequent use. The preferred fitting is referred to as a Schrader valve, which is the type of valve used to fill a tire with air.

A series of six 3/32" diameter, inwardly directed holes 156 in the filter 154 lead to a central passageway 160 that directs water that passes through the filter to the pilot valve 26.

The pilot valve 26 selectively opens and closes the pilot channel 22, controlling the flow of water through the pilot channel. The illustrated pilot valve is in the form of a ball valve. Rotating the ball valve to one position opens the pilot channel by aligning a pilot opening 24 with the central passageway 160. The flow area through the pilot opening is significantly narrower than the flow area through of the six inwardly directed holes 156 in the filter 154 and through the central passageway 160. The illustrated pilot opening 24 is a cross hole of 1/16" diameter. Rotating the ball valve to another position rotates the pilot opening out of alignment with the central passageway, closing the pilot channel.

Figure 16:
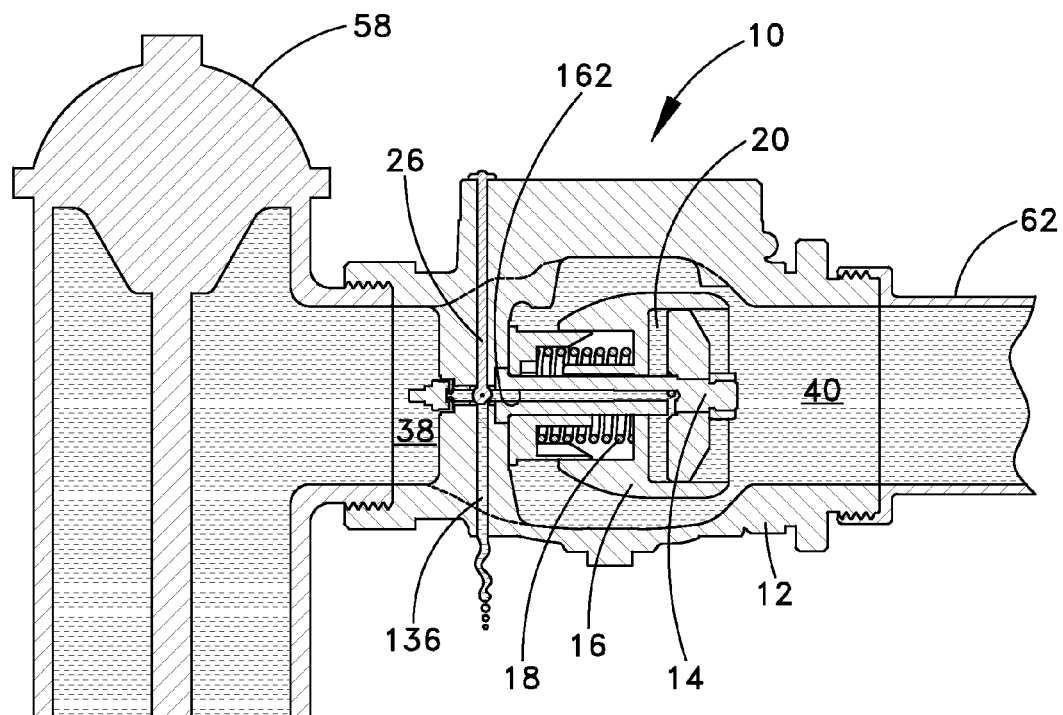
FIG. 16 is a cross-sectional schematic view of the valve on a hydrant, moving from the open position to the closed position.

When the pilot valve 36 is open, water that passes through the pilot opening 24 continues through the pilot channel 22 by passing through a tunnel 162 in the center of the valve shaft 14 and a series of three 3/16" diameter opening apertures 164 that lead into the pressure chamber 20. The illustrated apertures 164 are located at the intersection of the valve shaft 14 and the lateral chamber surface 92. In this location, liquid can flow from the apertures into the pressure chamber whether the piston 16 is in the open position (FIG. 15), in the closed position (FIG. 13), or in positions in between (FIGS. 14 and 16). Other arrangements can also be used.

Directing the pilot channel 22 through the tunnel 162 in the interior of valve, instead of outside of the main valve body 12 (as has been done in some pilot-assisted valves used in oil refineries or fire suppression systems) helps to delay freeze-up in the pilot channel as the portable valve 10 is brought outdoors into cold conditions. An interior channel also improves the damage resistance of the portable valve by eliminating tubes, fittings, valves, brackets, and hardware on the exterior of the valve, where they are prone to damage when a firefighter tosses the valve into a storage compartment after use.

When pressurized liquid from the upstream side of the flow channel 96 enters the pressure chamber 20, it provides the brute mechanical force needed to push the pressure chamber open. Specifically, in this example, the pressure of the liquid drives the moveable lateral piston surface 144 in an upstream direction away from the fixed lateral chamber surface 92, and thus drives the piston 16 to the open position against the force of the spring 18. Using the pressure of the liquid to open the valve, rather than a motor, allows a much smaller battery to be used in the present device than was required in prior devices. The illustrated valve 10 is powered by only 4 AA batteries, helping to keep the size of the unit less than 30" in height, in width, and in depth, and the weight under 50 pounds. The illustrated valve weighs only around 28 pounds and measures less than 14" in height, width, and depth.

Changing the arrangement or diameter of the pilot opening 24 will change the opening and closing speed of the valve 10. In firefighting situations, opening the valve too quickly can cause flow problems such as water hammer or an out-of-control hose. In this example, the valve components are sized and selected so that when the pilot valve is opened, liquid pressure of 50 to 180 psi in the upstream side of the flow channel fully opens the valve in 10-20 seconds. This is believed to be useful for firefighting situation.

In the illustrated arrangement, the piston 16 retains its open or closed state even if there is a power failure at either the R/C housing 28 or the remote controller 30. This will be discussed in later sections.

As seen in FIGS. 12A and 16, closing the pilot valve 26 simultaneously opens a passageway from the tunnel 162 in the pilot channel 22 to a pilot vent 166. Part of the passageway may extend through a slot in the side of the pilot valve. Opening this passageway provides an outlet for the liquid in the pressure chamber 20.

Once the pilot valve 26 is closed and the passageway from the tunnel 162 in the pilot channel 22 to the pilot vent 166 is opened, the spring 18 urges the piston 16 back to the closed position, applying a force for driving water out of the pressure chamber 20. The axial force of the spring is aided by an axial force of water pressure acting on a closing area 170 of the piston. The closing area is radially bounded by the inner diameter of the second annular wall 116 adjacent the outer surface 118 of the sleeve 112 and the outer diameter of the seating surface 110 on the forward edge of the piston. In arrangements like the one illustrated, water pressure will tend to move a piston toward the open position if the lateral piston surface 144 is larger than the closing area. Area ratios of 1.5:1 are generally satisfactory to assure reliable valve opening against parasitic loads of the disclosed spring, o-ring seal friction, and the dynamic forces of water flowing around the piston.

Alternatively, it is not necessary for the pilot valve 26 to open and close a pilot vent. For example, the pressure chamber 20 could be vented through the spring chamber 134 to atmosphere, avoiding the cost of two separate radial vents. Water from the pressure chamber might pass to the spring chamber through a tiny controlled pathway through lateral piston wall 102 and then exit the spring chamber via its radial vent 140.

Alternatively, a passageway from the pressure chamber could be arranged to remain open whenever the pressure chamber is pressurized, and thus continuously flow a controlled bleed from the pressure chamber 20 to a drain. Such an arrangement could help to prevent freezing in the valve and the hydrant in cold climates when the water in the hose can become stagnant for a considerable time, as happens at the end of a fire.

In other arrangements, the pressure chamber 20 could be made to vent to the inlet 38, to the central chamber 36, or to the outlet 40 rather than to atmosphere. When not in use, a valve whose pressure chamber is vented to the inlet or to the central chamber would remain in the closed position under the influence of the spring force. Once installed on a hydrant and pressurized, the valve would remain in the closed position while the pilot valve remained in the closed position. Opening the pilot valve 26 would fill the pressure chamber and open the valve. The valve would remain in the open position until the hydrant pressure was shut off, at which time spring force would expel water back through the pilot channel 22 and close the valve until subsequent use. This arrangement could be useful to protect against vandals who might intentionally shut off water to cause injury.

A valve whose pressure chamber 20 is vented to the outlet 40 would discharge water from the pressure chamber to the interior of the valve downstream of the shaft end. For environmental reasons, this arrangement would prevent discharge of water to ground and addresses concerns in some locations where a spill of water outside of a fire scene may be considered a reportable event. This type of valve would close only after relieving pressure downstream of the valve.

Other venting arrangements may be advantageous for other purposes.

The Pilot Shaft and R/C Housing

Figure 3B:
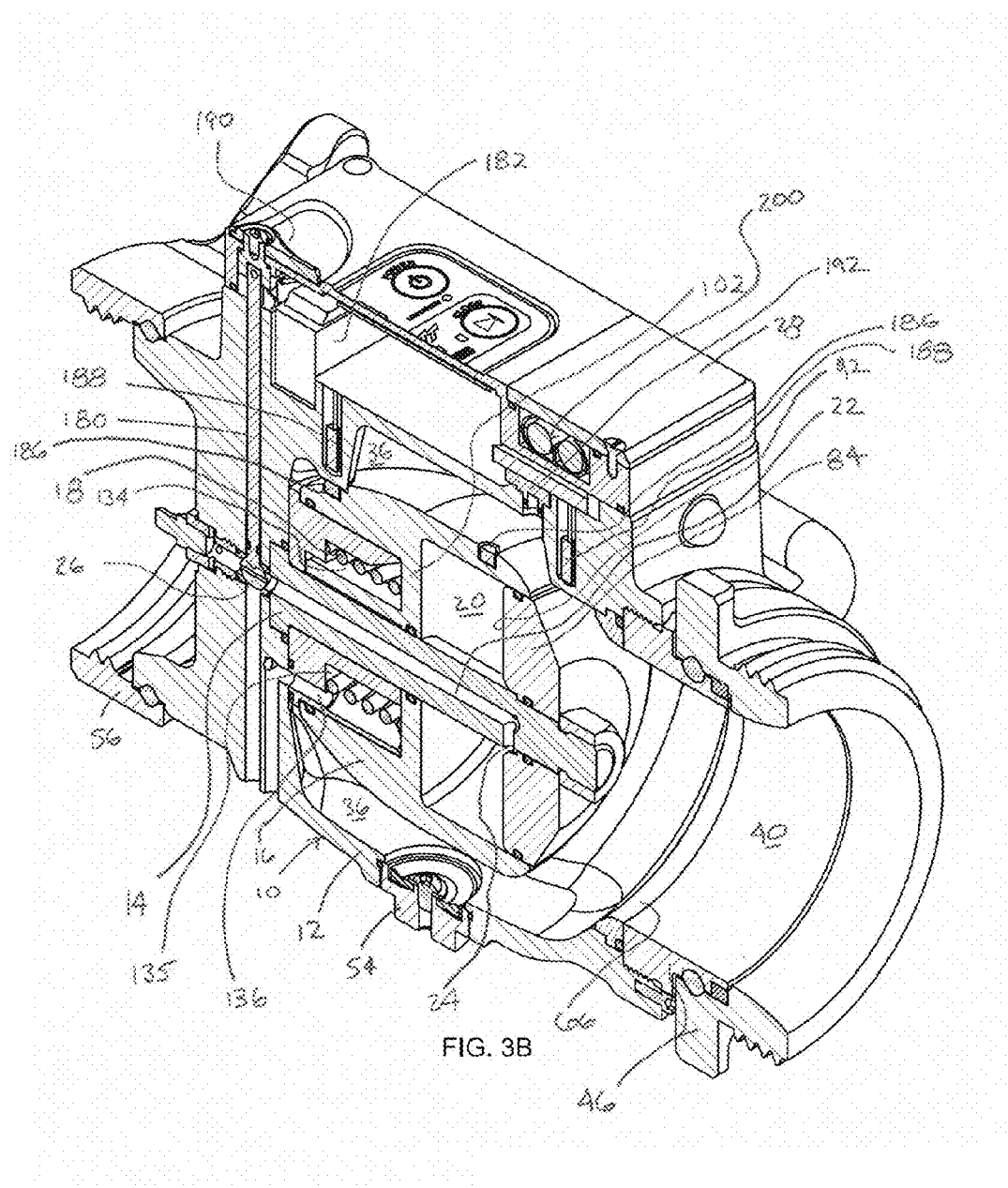
FIG. 3B is an isometric cross-section of a fourth embodiment of a valve the uses the new invention.
Figure 4:
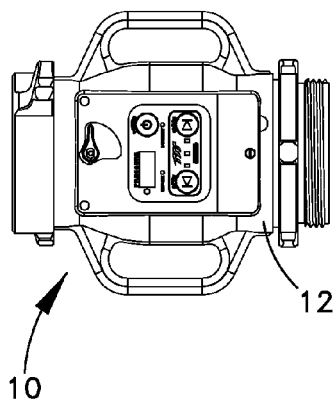
FIG. 4 is a top plan view of a valve with the body of the valve seen in FIG. 3 and the fittings of the valve seen in FIG. 2.

The illustrated pilot valve 26 is mounted on a lower end of a pilot shaft 180 that is actuated by a conventional servo motor 182 in an R/C housing 28 on the main valve body 12, as seen in FIGS. 3B and 9. In this example, a quarter turn of the pilot shaft moves the pilot valve from the position where the pilot channel 22 is open to the position where the pilot channel is closed and connected instead to the pilot vent 166. Other arrangements are possible. For example, the pilot valve could take the form of a gate valve mounted on an axially moving control rod powered by a solenoid.

In the example illustrated here, a handgrip 190 is mounted on an upper end of the pilot shaft 180, where it can be accessed by a user. This handgrip provides a visual indication of the state of the pilot valve 26 (open or closed) and also enables the user to manually open or close the pilot valve by simply turning the handgrip. This can be useful in the event of a battery or servomotor failure.

Power to the servomotor 182 is cut at stroke ends to conserve power and to allow manual control of the handgrip 190.

When the handgrip is in the form of a lever and the pilot valve stroke is 90 degrees, the lever position can mimic the symbolic position conventions of both the pilot valve 26 and the hydrant valve, i.e.: the lever being in-line with the axis 80 means that the valve is OPEN, while lever being perpendicular to the axis means the valve is CLOSED.

In the main valve body 12 seen in FIG. 3B, the handgrip 190 and control switches 188 for the servomotor 182 are recessed in the R/C housing 28, and an antenna is incorporated into the housing. All these features reduce the risk of damage if the valve is dropped.

A pressure switch 192 connected to the valve body 12 can be used to switch on the electronics (i.e., the servomotor 182, the radio receiver, etc.) when the valve inlet 38 is pressurized. To preserve battery life, the illustrated device is programmed to go into sleep mode if there is no activity for five minutes. These electronics can then be re-activated by the remote controller 30, discussed in the next section.

Preferably, the electronics within the R/C housing 28 and within the remote controller 30 are separated from and sealed from a separate battery compartment 200 (such as the one seen in FIG. 3B) where the batteries are installed. This can be done, for example, by a "lid-within-a-lid" arrangement. The use of separate and sealed compartments for the electronics helps to prevent water from damaging the electronics when the batteries are changed.

The Remote Controller

The remote controller 30 (FIG. 18) enables a user to selectively control the pilot valve 26 from a distance. The illustrated remote controller includes an electronic control panel 202 (FIG. 17) with separate buttons that include both a power switch 204 that turns on power to the remote controller and a valve open button 206 and a valve closed button 208 that cause an opening or closing signal to be transmitted from the remote controller 30 to the electronics within the R/C housing 28.

Conventional electromechanical feedback of the actual valve position (open or closed) signals the completion of a valve opening or valve closing command with a pair of magnets 186 and reed switches 188. While the illustrated device operates between simple open and closed positions, the device could also be arranged to offer modulation. This could be desirable, for example, for use with larger hoses.

As with the electronics in the R/C housing 28, it is preferred that the remote controller 30 is programmed to shut down five minutes after the last button is pressed. This helps to preserve battery life in the remote controller in the event the power switch on the remote controller is not shut off.

The illustrated remote controller 30 has indicator lights 210 that show whether a radio link has been established with the valve and provide a warning when battery power is low. The remote controller may also include a digital display 212 for reading the pressure and lights 214 to display valve position.

The valve depicted in FIG. 3B includes an R/C housing 28 that has an electronic control panel that is identical to the control panel used on the remote controller 30. Providing such a panel on the valve body 12 allows crosschecking between the control panels.

The illustrated valve 10 uses radio signals at, for example, 900 MHz, thus providing the remote controller 30 with an effective range of 1200'. This matches the common maximum distance of a firefighting supply hose. A 2.4 GHz frequency might also be useful.

Figure 19A:
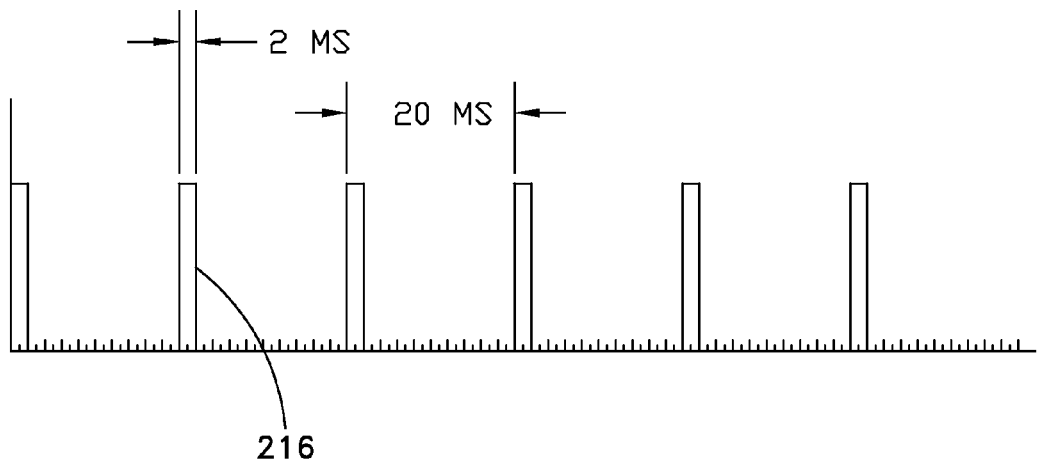
FIGS. 19A and 19B are wave form diagrams of opening and closing signals broadcast by the remote controller.
Figure 19B:
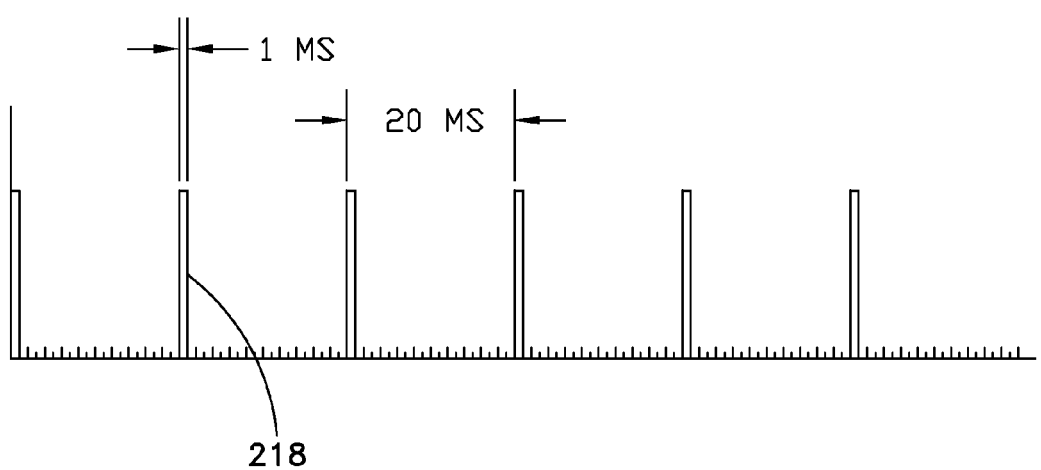

FIGS. 19A and 19B show the waveform of opening and closing signals broadcast by the remote controller 30. In the illustrated device, for example, a 2 ms pulse 216 shown in FIG. 19A is repeated every 20 milliseconds for a 1.5 second duration to ensure that the valve receives and executes the signal to open, while a 1 ms pulse 218 repetition shown in FIG. 19B ensures the valve to be closed. Although one pulse is enough to drive the servomotor 182 to its limit under normal conditions, full stroke is ensured if the duration of the repetition is longer than the time needed to fully change the position of the pilot valve 26.

It is evident from the prior discussion that the portable valve 10 may be remotely controlled by using either the remote control panel 202 on the portable valve, the handgrip 190, or the wireless remote controller 30. Each of these can act as a remote controller to change the position of the piston 16 within the portable valve. Multiple wireless remote controllers may also be used to control the portable valve.

This description of various embodiments of the invention has been provided for illustrative purposes. Revisions or modifications may be apparent to those of ordinary skill in the art without departing from the invention. The full scope of the invention is set forth in the following claims.

The invention claimed is:

1. A portable valve that has:
a main valve body that has an inlet to and an outlet from a central chamber;
a piston that is mounted for axial movement within the central chamber between an open position and a closed position;
a seating surface on the piston that seats against part of the valve when the piston is in the closed position and moves away from that part of the valve when the piston moves to the open position, opening a flow channel between the inlet and the outlet when the piston is in the open position and closing that flow channel when the piston is in the closed position;
a peripheral wall on the piston that has an outer surface that forms a boundary of the flow channel when the piston is in the open position, and an inner surface that faces radially inwardly;
a pressure chamber that is bounded by the inner surface on the peripheral wall on the piston and a lateral surface that is fixed in position within the valve body;
a pilot channel of fixed shape along its entire fluid length that extends from an upstream side of the flow channel to the pressure chamber;
a pilot valve that selectively opens and closes the pilot channel, putting the upstream side of the flow channel in fluid communication with the pressure chamber when the pilot valve is open, and blocking such communication when the pilot valve is closed; and
a remote controller that enables an operator to selectively control the pilot valve from a distance.

2. A portable valve as recited in claim 1, in which:
the valve has a coupling on the inlet that connects to fire hydrants;
the valve components are sized and selected so that when the pilot valve is open, liquid pressure of 50 to 180 psi in the upstream side of the flow channel fully opens the valve in 10-20 seconds; and
the valve weighs less than 50 pounds and measures less than 30" in height, in width, and in depth.

3. A portable valve as recited in claim 1, in which:
the pilot valve is connected to a control shaft that is actuated by a servo motor.

4. A portable valve as recited in claim 1, in which:
the pilot valve is connected to a control shaft that is rotated by a servo motor and has an externally mounted handgrip that can be manually controlled.

5. A portable valve as recited in claim 1, in which:
the angle between the valve shaft and an axis between the center of the inlet and the center of the outlet is less than 45 degrees.

6. A portable valve that has:
a main valve body that has an inlet to and an outlet from a central chamber;
a piston that is mounted for axial movement within the central chamber between an open position and a closed position and has an annular wall that slides over an outer edge of a lateral chamber surface that is fixed in position within the main valve body;
a seating surface on the piston that seats against part of the valve when the piston is in the closed position and moves away from that part of the valve when the piston moves to the open position, opening a flow channel between the inlet and the outlet when the piston is in the open position and closing that flow channel when the piston is in the closed position;
a peripheral surface on the piston that forms a boundary of the flow channel when the piston is in the open position;
a pressure chamber that is bounded by the lateral chamber surface and interior surfaces on the piston;
a pilot channel that extends from an upstream side of the flow channel to the pressure chamber;
a pilot valve that selectively opens and closes the pilot channel, allowing liquid in the upstream side of the flow channel to flow to the pressure chamber when the pilot valve is open, and blocking such flow when the pilot valve is closed; and
a remote controller that enables an operator to selectively control the pilot valve from a distance.

7. A portable valve that has:
a main valve body that has an inlet to and an outlet from a central chamber;
a piston that is mounted for axial movement within the central chamber between an open position and a closed position and has an annular wall that extends in an axial direction from a radially outward edge of a lateral piston wall and slides over an outwardly facing edge of a lateral chamber surface that is fixed in position within the main valve body;
a seating surface on the piston that is on an axial end of the annular wall opposite the lateral piston wall and seats against part of the valve when the piston is in the closed position and moves away from that part of the valve when the piston moves to the open position, opening a flow channel between the inlet and the outlet when the piston is in the open position and closing that flow cancel when the piston is in the closed position;
a second annular wall that is on the piston, extends from the radially outward edge of the lateral piston wall in an axial direction away from the seating surface, and has an axial end that slides over a sleeve;
a peripheral surface on the piston that forms a boundary of the flow channel when the piston is in the open position;
a pressure chamber that is formed between the lateral chamber surface and interior surfaces on the piston;
a pilot channel that extends from an upstream side of the flow channel to the pressure chamber;
a pilot valve that selectively opens and closes the pilot channel, allowing liquid in the upstream side of the flow channel to flow to the pressure chamber when the pilot valve is open, and blocking such flow when the pilot valve is closed; and
a remote controller that enables an operator to selectively control the pilot valve from a distance.

8. A portable valve as recited in claim 6, in which:
the lateral chamber surface extends radially outwardly from a valve shaft that is fixed in position within the valve body; and
the pilot channel extends through the valve shaft.

9. A portable valve as recited in claim 6, in which:
the lateral chamber surface extends radially outwardly from a valve shaft that is fixed in position within the valve body;
the piston has a second, oppositely directed annular wall with an upstream end that slides over an element on the valve shaft; and
the pilot channel extends through the valve shaft.

10. A portable valve as recited in claim 6, in which:
the pilot channel is fixed in location and shape from its source at the upstream side of the flow channel to the pilot valve; and
the pilot valve vents the pressure chamber to the atmosphere when the piston is in the closed position.

11. A portable valve that has:
a main valve body that has an inlet to and an outlet from a central chamber;
a piston that is mounted for axial movement within the central chamber between an open position and a closed position and has an annular wall that is in sliding engagement with an outer edge of a shaft end on a valve shaft;
a seating surface on the piston that seats against part of the valve when the piston is in the closed position and moves away from that part of the valve when the piston moves to the open position, opening a flow channel between the inlet and the outlet when the piston is in the open position and closing that flow channel when the piston is in the closed position;
a spring that biases the piston toward the closed position;
a peripheral surface on the annular wall that forms a boundary of the flow channel when the piston is in the open position;
a pressure chamber that is formed between three surfaces (a) a lateral chamber surface that extends between the valve shaft and the outer edge of the shaft; (b) a lateral surface on the piston, and (c) an annular wall interior surface opposed to the peripheral annular wall surface;
a pilot channel that extends from an upstream side of the flow channel to the pressure chamber;
a pilot valve that selectively opens and closes the pilot channel, allowing liquid in the upstream side of the flow channel to flow to the pressure chamber when the pilot valve is open, and blocking such flow when the pilot valve is closed; and
a remote controller that enables an operator to selectively control the pilot valve from a distance.

12. A portable valve as recited in claim 11, in which:
the lateral surface on the piston is on one side of a lateral piston wall;
the piston has a second annular wall with a second end that slides against a surface on a sleeve around the valve shaft, forming a spring chamber that is isolated from the flow channel; and
the spring is mounted in the spring chamber, against the lateral piston wall.

13. A portable valve as recited in claim 11, in which:
the spring is mounted around the valve shaft.

14. A portable valve as recited in claim 11, in which:
the pilot valve vents the pressure chamber to the atmosphere when the pilot valve is closed.

15. A portable valve that has:
a main valve body that has an inlet to and an outlet from a central chamber;
a piston that is mounted for axial movement within the central chamber between an open position and a closed position;
a seating surface on the piston that seats against part of the valve when the piston moves to the closed position and moves away from that part of the valve when the piston moves to the open position, opening a flow channel between the inlet and the outlet when the piston is in the open position and closing that flow channel when the piston is in the closed position;
a peripheral surface on the piston that forms a boundary of the flow channel when the piston is in the open position;
a lateral piston surface on the piston that faces a lateral chamber surface that is fixed in position within the valve body;
a pilot channel that extends from an upstream side of the flow channel to a pilot opening between the lateral piston surface and the opposed lateral chamber surface and is of fixed shape from its source at the upstream side of the flow channel to the pilot valve as the valve opens and closes;
a pilot valve that selectively opens and closes the pilot channel, allowing liquid in the upstream side of the flow channel to flow to a pressure chamber that is formed between the lateral piston surface and the opposed lateral chamber surface when the pilot valve is open, and blocking such flow when the pilot valve is closed; and
a remote controller that enables an operator to selectively control the pilot valve from a distance.

16. A portable valve as recited in claim 15, in which:
the pilot valve vents the pressure chamber to the atmosphere when the pilot valve is closed.

17. A portable valve that has:
a main valve body that has an inlet to and an outlet from a central chamber;
a valve shaft that is fixed within the main valve body;
a shaft end that is fixed to one end of the valve shaft and has a radial chamber surface that extends radially outwardly from the valve shaft to an outer circumferential edge on the shaft end;
a piston that is mounted for axial movement within the central chamber and has a radially inward-facing wall that slides directly against the outer circumferential edge on the shaft end;
a seating surface on the piston that seats against part of the valve when the piston moves to a closed position and moves away from that part of the valve when the piston moves to an open position, opening a flow channel between the inlet on the valve body and the outlet on the valve body when the piston is in the open position and closing that flow channel when the piston is in the closed position;
a radial piston surface on the piston that faces the radial chamber surface on the shaft end and extends radially inwardly from the radially inward-facing wall on the piston;
a pilot channel that extends from an upstream side of the flow channel through the valve shaft to a pilot opening between the radial piston surface and the radial chamber surface;
a pilot valve that selectively opens and closes the pilot channel, allowing liquid in the upstream side of the flow channel to flow to a pressure chamber that is formed between the radial piston surface and the opposed radial chamber surface when the pilot valve is open, and blocking such flow when the pilot valve is closed; and a remote controller that enables an operator to selectively control the pilot valve from a distance.

18. A portable valve as recited in claim 17, in which:

the pilot valve vents the pressure chamber to the atmosphere when the pilot valve is closed.

19. A portable valve that has:

a main valve body that has an inlet to and an outlet from a central chamber;

a piston that is mounted for axial movement within the central chamber and has a radially inward-facing wall that with an inner face that slides directly against an outer circumferential edge on an element that is fixed in position within the valve body;

a seating surface on the piston that seats against part of the valve when the piston moves to a closed position and moves away from that part of the valve when the piston moves to an open position, opening a flow channel between the inlet on the valve body and the outlet on the valve body when the piston is in the open position and closing that flow channel when the piston is in the closed position;

a radial piston surface on the piston that extends radially inwardly from the inner face of the inward-facing wall on the piston and faces a radial chamber surface that is fixed in position within the valve body;

a pilot channel that extends from an upstream side of the flow channel to a pilot opening between the radial piston surface and the opposed radial chamber surface;

a pilot valve that selectively opens and closes the pilot channel, allowing liquid in the upstream side of the flow channel to flow to a pressure chamber that is formed between the radial piston surface and the opposed radial chamber surface when the pilot valve is open, and blocking such flow when the pilot valve is closed; and a remote controller that enables an operator to selectively control the pilot valve from a distance.

20. A portable valve as recited in claim 19, in which:

the pilot valve vents the pressure chamber to the atmosphere when the pilot valve is closed.

\* \* \* \* \*